(12) United States Patent
Flegel

(10) Patent No.: US 9,509,139 B1
(45) Date of Patent: Nov. 29, 2016

(54) TRANSFER SWITCH FOR AUTOMATICALLY SWITCHING NEUTRALS FOR ONE OR MORE LOADS BETWEEN TWO ELECTRICAL SOURCES OF POWER

(75) Inventor: Michael O. Flegel, Racine, WI (US)

(73) Assignee: Reliance Controls Corporation, Racine, WI (US)

(*) Notice: Subject to any disclaimer, the term of this patent is extended or adjusted under 35 U.S.C. 154(b) by 1349 days.

(21) Appl. No.: 13/339,069

(22) Filed: Dec. 28, 2011

(51) Int. Cl.
  *H02J 3/00* (2006.01)
(52) U.S. Cl.
  CPC .................................. *H02J 3/00* (2013.01)
(58) Field of Classification Search
  CPC .................................. H04Q 3/00; H02J 3/00
  USPC ............. 307/112–116, 44, 64–66, 125, 130
  See application file for complete search history.

(56) References Cited

U.S. PATENT DOCUMENTS

| | | | | |
|---|---|---|---|---|
| 2,245,342 A | * | 6/1941 | Hoye | H02J 9/06 307/64 |
| 3,936,782 A | * | 2/1976 | Moakler et al. | 335/161 |
| 4,021,678 A | * | 5/1977 | Moakler et al. | 307/64 |
| 4,384,213 A | * | 5/1983 | Bogel | 307/64 |
| 5,070,252 A | * | 12/1991 | Castenschiold | H01H 71/002 307/113 |
| 6,876,103 B2 | * | 4/2005 | Radusewicz | H02J 9/06 307/125 |
| 7,099,130 B2 | * | 8/2006 | Angle et al. | 361/44 |
| 7,259,481 B2 | * | 8/2007 | Eaton et al. | 307/125 |
| 7,418,314 B2 | * | 8/2008 | Rasmussen et al. | 700/286 |
| 7,449,645 B1 | | 11/2008 | Flegel | |
| 7,462,791 B1 | * | 12/2008 | Flegel | H01H 9/26 200/50.32 |
| 7,602,083 B1 | | 10/2009 | Flegel et al. | |
| 7,737,579 B1 | * | 6/2010 | Czarnecki | H01H 9/26 307/64 |
| 7,772,723 B1 | * | 8/2010 | Flegel | H02B 1/056 307/125 |
| 7,816,813 B2 | * | 10/2010 | Yagudayev et al. | 307/64 |
| 7,834,486 B1 | | 11/2010 | Flegel et al. | |
| 7,888,821 B2 | | 2/2011 | Flegel et al. | |
| 7,932,635 B2 | * | 4/2011 | Shenoy | H02J 9/061 307/64 |
| 8,138,433 B2 | | 3/2012 | Czarnecki et al. | |
| 8,269,120 B1 | * | 9/2012 | Flegel | H01H 9/26 200/43.11 |
| 8,624,430 B2 | * | 1/2014 | Watson et al. | 307/31 |
| 2003/0034693 A1 | * | 2/2003 | Wareham | H02J 9/06 307/23 |
| 2004/0169422 A1 | * | 9/2004 | Eaton et al. | 307/64 |
| 2005/0134121 A1 | * | 6/2005 | Lathrop et al. | 307/80 |
| 2005/0270720 A1 | * | 12/2005 | Johnson, Jr. | 361/170 |
| 2005/0278075 A1 | * | 12/2005 | Rasmussen | H02J 9/06 700/286 |
| 2006/0028069 A1 | * | 2/2006 | Loucks et al. | 307/130 |
| 2006/0146581 A1 | * | 7/2006 | Murphy | 363/37 |
| 2007/0018506 A1 | * | 1/2007 | Paik et al. | 307/115 |
| 2008/0150363 A1 | * | 6/2008 | Kuo | 307/64 |
| 2008/0203820 A1 | * | 8/2008 | Kramer | H02J 3/38 307/64 |
| 2009/0058191 A1 | * | 3/2009 | Nordman et al. | 307/112 |
| 2010/0026208 A1 | * | 2/2010 | Shteynberg et al. | 315/297 |
| 2010/0141038 A1 | * | 6/2010 | Chapel et al. | 307/64 |
| 2010/0141040 A1 | * | 6/2010 | Chapel et al. | 307/80 |
| 2010/0328850 A1 | * | 12/2010 | Remmert | 361/634 |
| 2012/0049638 A1 | * | 3/2012 | Dorn et al. | 307/87 |
| 2012/0229191 A1 | * | 9/2012 | Galm | H03K 17/735 327/427 |
| 2013/0070394 A1 | * | 3/2013 | Batzler | H02J 3/005 361/624 |

* cited by examiner

*Primary Examiner* — Adi Amrany
(74) *Attorney, Agent, or Firm* — Boyle Fredrickson, S.C.

(57) ABSTRACT

A method and system for selectively controlling the supply of electrical power to an electrical panel that is capable of receiving electrical power from more than one power source, such as a utility power supply and an auxiliary power supply, e.g., an electrical generator, prevents the neutral conductor of the electrical panel from being connected to one power supply when the hot conductors of the electrical panel are connected to another power supply.

14 Claims, 2 Drawing Sheets

TRANSFER SWITCH FOR AUTOMATICALLY SWITCHING NEUTRALS FOR ONE OR MORE LOADS BETWEEN TWO ELECTRICAL SOURCES OF POWER

CROSS-REFERENCE TO RELATED APPLICATION

This application claims the benefit of U.S. Ser. No. 61/427,655 filed on Dec. 28, 2010, the disclosure of which is incorporated herein in its entirety.

BACKGROUND AND SUMMARY OF THE INVENTION

The invention generally provides a transfer switch for automatically connecting the neutrals of one or more loads to an alternate power source, such as an electric generator, when a transfer to alternate power is made from primary power, such as a utility, and for automatically reconnecting the neutrals to the primary power supply when a transfer back to primary power is made.

A transfer switch is an electrical switch that connects an electrical load to a standby or auxiliary power supply when electrical power from a primary power supply, such as a utility power supply, has been lost. Transfer switches can be classified into one of two groups: manual transfer switches and automatic transfer switches. Manual transfer switches require a user, such as a homeowner, to physically throw the switch to connect electrical loads to the standby power supply, which in many instances is an electrical generator. When the primary power supply has been restored, the user must then throw the switch back to its previous position to reconnect the electrical loads back to the primary power supply.

An automatic transfer switch, on the other hand, is designed to automatically connect the electrical load to the standby power supply upon the loss or interruption of primary electrical power. Automatic transfer switches are often installed where a backup electrical generator is located so that the electrical generator can provide temporary electrical power if the primary power supply fails. In this regard, as well as transferring the electrical loads to the electrical generator, an automatic transfer switch also commands the electrical generator to start based on a disruption in the primary power supply. The transfer switch also isolates the electrical generator from the primary power supply when the generator is on and is providing temporary power.

Thus, for example, in a home equipped with a backup generator and an automatic transfer switch, when an electric utility outage occurs, the automatic transfer switch will signal the backup generator to start. Once the automatic transfer switch sees that the generator is ready to provide electric power, the automatic transfer switch breaks the connection to the electric utility and connects the generator to certain selected electrical circuits in the building, which are typically those circuits that power critical items or equipment such as a sump pump, furnace, refrigerator, medical equipment, etc. If the generator is large enough, it may be connected to all of the loads in the building. The generator supplies electrical power to the electric loads, but is not connected to the electric utility. Isolation of the generator from the electrical distribution system is required to protect the generator from overload, and to prevent accidental energization of the service wiring. When utility power returns for a set time, the automatic transfer switch will transfer back to utility power and command the electrical generator to turn off, after another specified amount of "cool down" time with no load on the generator.

In addition to being classified as manual or automatic, transfer switches can also be classified as either separately derived systems or non-separately derived systems. In a separately derived system, there is no direct electrical connection, including a solidly connected grounded circuit conductor, to supply conductors of the electrical generator. On the other hand, in a non-separately derived system, the electrical generator has a "solidly connected" grounded circuit conductor. In the case of the latter, the grounded conductor, i.e., neutral, of the electrical generator is solidly connected to the neutral conductor of the main electrical panel. In the case of the former, however, the transfer switch must switch the neutrals. That is, the transfer switch must switchably connect the neutral conductor of the electrical panel to the neutral of either the electrical generator or the utility power supply. So, for use in a separately derived system, the automatic transfer switch must also switch the neutrals automatically upon the loss of primary electrical power and the subsequent return of primary electrical power.

One proposed automatic switch for switching the neutrals uses a contactor that switches the neutral conductor of the electrical panel to the electrical generator neutral whenever a running generator is connected to the system. More particularly, the contactor has a coil that is energized when electrical current flows from one generator hot conductor to the generator neutral. Energization of the coil causes an armature to move the neutrals switch to connect the panel neutral conductor with the neutral conductor of the electrical generator. When the electrical generator is shut-off or otherwise not supplying electrical power to the load center, the coil will become de-energized and the armature will be released to allow the neutrals switch to reset and reconnect the neutral conductor of the load center with the neutral conductor of the primary power supply. This design, however, allows the transfer switch to reconnect the hot conductors of the electrical panel back with the hot conductors of the primary power supply when primary power is restored but, if the electrical generator is still running and connected to the transfer switch, the neutral of the electrical panel will not be switched back. This makes primary power, e.g., utility power, available to the loads of the electrical panel with no neutral connection. As a result, either a load on the electrical panel may receive electrical power at high, and potentially damaging, voltages or the ground wire may conduct current, creating a potential safety issue. The exposure to undesirable high voltages may also occur during post-installation testing when it is not uncommon for an installer to test operation of the automatic transfer switch and electrical generator with the primary supply on and connected to the electrical panel.

The present invention is directed to a method and system of selectively controlling the supply of electrical power to an electrical panel that is capable of receiving electrical power from more than one power source, such as a utility power supply and an auxiliary power supply, e.g., electrical generator. More particularly, the invention prevents the neutral conductor of the electrical panel from being connected to one power supply when the hot conductors of the electrical panel are connected to another power supply. In this regard, the present invention prevents the neutral conductor of the electrical panel from remaining electrically connected to the neutral conductor of the electrical generator when primary power has been restored and the hot conductors of the electrical panel have been reconnected to the hot conductors of the primary power supply. In a similar fashion, the invention prevents the neutrals from being switched to the electrical generator when primary power is feeding electrical power to the electrical panel.

The present invention uses the voltage supplied to the transfer switch, i.e., the transfer switch bus, to determine the appropriate position for a neutrals transfer switch. When the voltage potential or drop between the transfer switch bus and the primary power supply is at or near the rated voltage of the power supply, e.g., 240V, the neutrals transfer switch connects the neutral conductor of the electrical panel to the neutral conductor of the primary power supply. On the other hand, when the voltage potential between the transfer switch bus and the auxiliary power supply, e.g., electrical generator, is at or near the rated voltage of the auxiliary power supply, e.g., 240V, the neutrals transfer switch connects the neutral conductor of the electrical panel to the neutral conductor of the auxiliary power supply. In this regard, the switching of the neutral conductor of the electrical panel is based on which power supply is feeding the transfer switch bus.

In one embodiment of the invention, a contactor having a coil and movable armature is used to detect the voltage potential between the transfer switch bus and the primary power supply or auxiliary power supply. In another embodiment, a microcontroller and associated sensors may be used to measure the aforementioned voltage drop and control relays or switches to make the neutrals connections.

One object of the invention is to provide a stand-alone switching apparatus for use with a transfer switch that automatically and independently switches the neutrals of a separately derived transfer system.

It is another object of the invention to provide a neutrals switch for use with a transfer switch in which the neutrals switch is integrally formed with the transfer switch yet independently connects the neutral of an electrical panel to one of a pair of power supplies based on which power supply is energized to provide electrical power to the transfer switch.

It is a further object of the invention to provide a neutral switching apparatus that prevents the neutrals of a transfer switch system from being electrically connected to a power supply that is different from the power supply that is feeding electrical power to the transfer switch system.

Various other features, objects and advantages of the invention will be made apparent from the following description taken together with the drawings.

BRIEF DESCRIPTION OF THE FIGURES

The drawings illustrate the best mode presently contemplated of carrying out the invention.

In the drawings.

DETAILED DESCRIPTION

Figure 1:
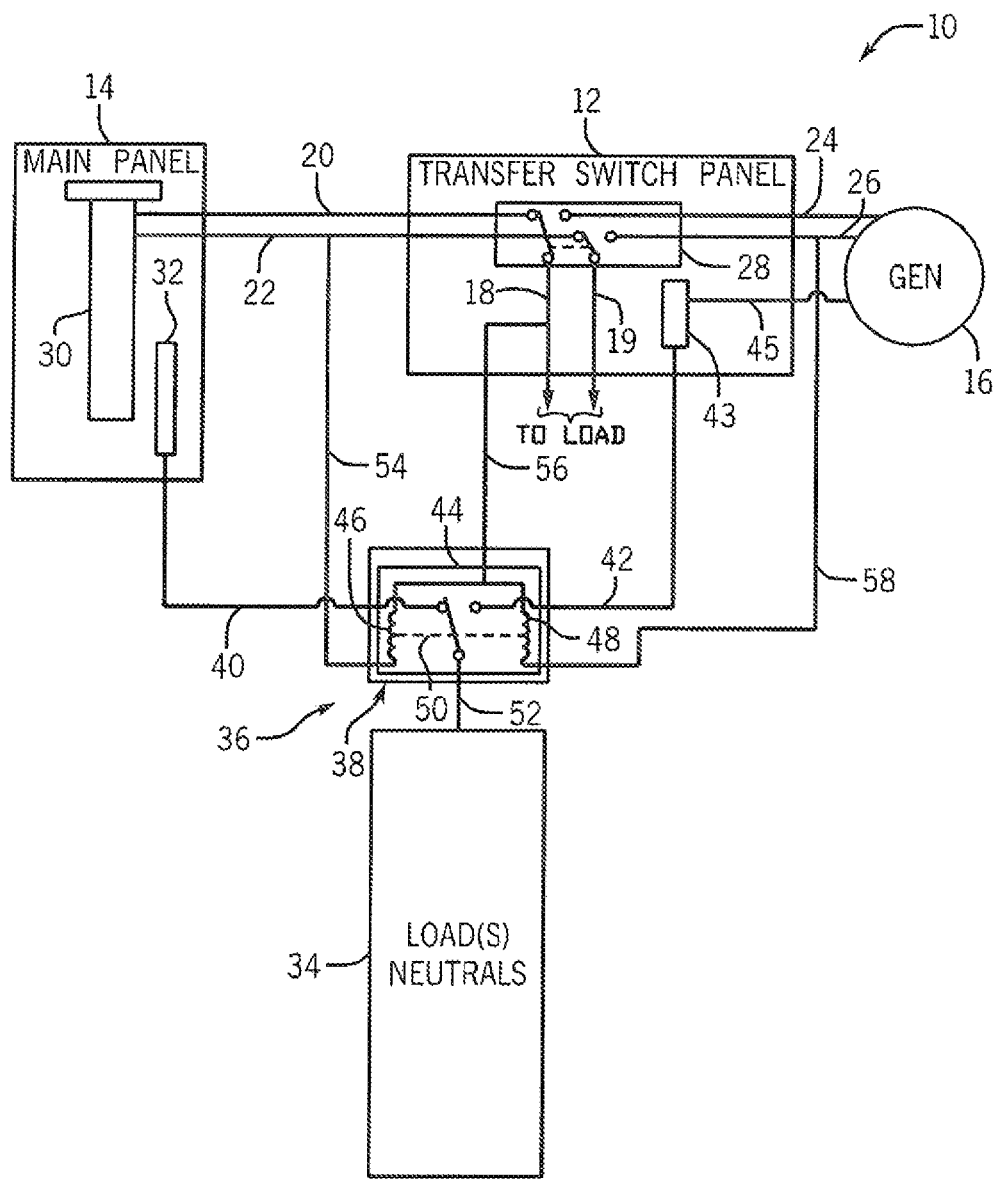
FIG. 1 is a schematic representation showing a transfer switch arrangement for interconnecting an auxiliary power source, such as a portable electrical generator, with a load center or electrical panel associated with a building and having a neutrals switching apparatus according to a first embodiment of the present invention.

Turning now to FIG. 1, a transfer switch arrangement incorporating a neutrals switching apparatus according to a first embodiment of the present invention is shown. This embodiment of the present invention is usable with a conventional power transfer arrangement 10 such as that having a transfer switch panel 12 which is interconnected between an electrical panel or load center 14 and an electrical generator 16. The transfer switch panel 12 has electrical conductors 18, 19 (L1, L2 to the load) that are switchably connected to receive electrical power from a utility power supply (not shown) via electrical conductors 20, 22 (L1, L2 from the utility supply) of the electrical panel 14 or the electric generator 16 via electrical conductors 24, 26 (L1, L2 from the generator 16). The electrical conductors 18, 19 may be, for example, an electrical bus on the transfer switch panel 12. It is understood that the electrical conductors 18, 19 are electrically connected to the input conductors in a conventional manner. A transfer switch 28 is operable to electrically connect the electrical conductors 18, 19 to either the utility power supply (through the main electrical panel 14) or the electric generator 16. The transfer switch 28 may be of conventional design and, as known in the art, is designed to electrically isolate the electrical conductors 18, 19 from the electric generator 16 when utility power is being provided to the electrical conductors 18, 19, and electrically isolate the electrical conductors 18, 19 to the load from the utility power supply when the electric generator 16 is feeding electrical power to the electrical conductors 18, 19.

The electrical conductors 20, 22 are interconnected between the electrical conductors 18, 19 to the load on the transfer switch panel 12 and an electrical bus 30 of the electrical panel 14. The electrical bus 30 is electrically connected to the utility power supply and thus utility power may be fed to the electrical conductors 18, 19 of the transfer switch panel 12 to power loads connected to the transfer switch panel 12 via conductors 20, 22. Alternately, conductors 20, 22 may be connected directly to the utility power supply.

The electric generator 16 feeds electrical power to the electrical conductors 18, 19 when utility power is interrupted. It will thus be appreciated that the transfer switch panel 12 may include components and circuitry to detect the loss of utility power and automatically electrically connect the electrical conductors 18, 19 to the electric generator. Such technology is generally well known and thus will not be described in greater detail. Moreover, it is understood that the transfer switch panel 12 may include components to cause the electric generator 16 to start automatically upon the loss of utility power.

The electrical panel 14 has a neutral bus 32, which connects to the neutrals 34 of the one or more loads (not shown) that are fed electrical power through the transfer switch panel 12. In contrast to conventional transfer switch arrangements, the present invention provides a neutrals transfer apparatus 36 that includes a switch 38 connected between the load neutrals 34 and the neutral bus 32 of the electrical panel 14 via a conductor 40, to selectively connect the load neutrals 34 to the neutral bus 32 when utility power is feeding electrical power to the electrical conductors 18, 19 of the transfer switch panel 12. In addition, neutrals transfer switch 38 is also connected to the neutral of the generator 16 via a conductor 42, to selectively connect the load neutrals 34 to the neutral of the generator 16 when generator 16 is feeding electrical power to the electrical conductors 18, 19 of the transfer switch panel 12.

The neutrals transfer switch 38 is operable to automatically make the transfer of the load neutrals 34 between the neutral bus 32 and the neutral of the generator 16. In one embodiment, the neutrals transfer switch 38 includes a contactor 44 having a pair of coils 46, 48 each of which is wrapped about an armature 50, such that energization of the coils causes the armature 50 to selectively move between first and second positions. When the armature 50 is in the first position, the contactor 44 electrically connects the load neutrals 34 to the neutral bus 32 of the electrical panel 14. Conversely, when the armature 50 is in the second position, the contactor 44 electrically connects the load neutrals 34 to the neutral of the generator 16.

The neutrals transfer switch 38 connects to the neutral bus 32 of the main electrical panel via conductor 40, and the load neutrals 34 connect to the neutrals transfer switch 38 via a conductor 52.

The neutral of the electric generator 16 connects to the neutrals transfer switch 38 via neutral conductor 42. Representatively, the generator neutral may be connected to the neutral conductor 42 through a neutral bus 43 in the transfer switch panel 12 and a conductor 45 that extends between transfer panel neutral bus 43 and the neutral connection of generator 16.

The neutrals transfer switch 38 automatically connects the load neutral bus 34 to the main panel bus 32 or the generator neutral conductor 42 based on which power supply is supplying electrical power to the transfer switch panel 12. Doing so avoids the possibility of the neutrals transfer switch 38 erroneously connecting the load neutral bus 34 to the generator neutral conductor 42 when the utility power supply is feeding power to the transfer switch panel 12. That is, switching of the neutrals transfer switch 38 is not controlled based on electrical current flow between a generator conductor 24 or 26 and the generator neutral conductor 42, which can result in the load neutrals 34 being electrically connected to the electric generator 16 after the transfer switch 28 has been switched to the utility position upon the restoration of utility power if the electric generator is still running. In such a scenario, utility power can be fed to the loads without the neutrals of the loads being connected to the utility neutral, i.e., neutral bus 32. This can result in either some loads receiving electrical power at a much higher, and potentially, damaging voltage or an unsafe current to flow on the ground wire.

In the present invention switching of the neutrals transfer switch 38 is controlled based on which power supply is feeding electrical power to the transfer switch panel 12. Since the transfer switch 28 can be either an automatic or manual transfer switch, it can connect the electrical conductors 18, 19 to the electric generator 16 when utility power is interrupted. Similarly, the transfer switch 28 will restore connection of the electrical conductors 18, 19 to the utility power supply when utility power is restored. When utility power is available, the voltage potential between electrical conductor 22 and the electrical conductor 18 on the load side of the transfer switch 28 will be 240 volts. Conversely, if transfer switch panel 12 is switched to the generator, the voltage potential between the electrical conductor 22 and the electrical conductor 18 on the load side of the transfer switch 28 will drop to zero volts. When the transfer switch 28 is switched to electrically connect the electrical conductor 18 on the load side to the electrical generator 16, the voltage potential between conductor 26 of the electric generator 16 and the electrical conductor 18 on the load side of the transfer switch 28 will be 240 volts. The present invention exploits these differences in voltage potentials to control switching of the neutrals transfer switch 38. Although the example described above discusses a 240 volt potential, it is further contemplated that other voltage potentials may be used to control switching of the neutrals transfer switch 38. For example, the voltage potential may vary by location between about 230 volts to 250 volts. Similarly, some foreign utilities generate 200-210 volts. As still another option, the switch 38 may be configured to operate on a 400 volt or a 575 volt utility grid. The 400 volt utility grid may supply a potential between 400-480 volts. Still other voltage potentials may be utilized without deviating from the scope of the present invention.

According to one embodiment of the invention, the power transfer arrangement 10 includes a set of sensing leads 54, 56, and 58 that are connected to provide operating information to the neutrals transfer apparatus 36. The sensing leads 54, 56, and 58 may be configured to detect the amplitude of voltage or current present on its corresponding conductor. As illustrated, the sensing leads 54, 56, and 58 detect the amplitude of voltage on the conductors connected to the neutrals transfer apparatus 36. When the voltage between leads 54 and 56 is present, for example at 240 volts, the neutrals transfer switch 38 electrically connects neutral conductor 52 to the neutral bus 32 of the electrical panel 14 via neutral conductor 40. On the other hand, if the voltage between leads 58 and 56 is 240 volts, the neutrals transfer switch 38 electrically connects the neutral conductor 52 to the neutral of the generator 16 via neutral conductor 42. It can thus be appreciated that the switching of the neutrals transfer switch 38 depends on which power supply is feeding electrical power to the electrical bus 18 of the transfer switch panel 12.

The load neutrals 34 and the neutrals transfer switch 38 may be incorporated into either the housing of transfer switch panel 12 or the housing of the electrical panel, although it is understood that any other satisfactory configuration and arrangement may be employed as desired.

As noted above, in one embodiment, the neutrals transfer switch 38 is in the form of a contactor 44 having a pair of coils 46, 48 that when energized cause the armature 50 to switch between the first and second positions as noted above. It will thus be appreciated that when utility power is feeding the electrical bus 18, the voltage between sensing leads 54 and 56 will be present, for example at 240 volts, which causes the first coil 46 to move the armature 50 to the first position which switches the load neutrals to the utility neutral bus 32. When the electric generator 16 is feeding electrical power to the electrical bus 18, the voltage between sensing leads 58 and 56 will be 240 volts, which causes the second coil 48 to move the armature 50 to the second position which switches the load neutrals 34 to the generator neutral conductor 42.

Figure 2:
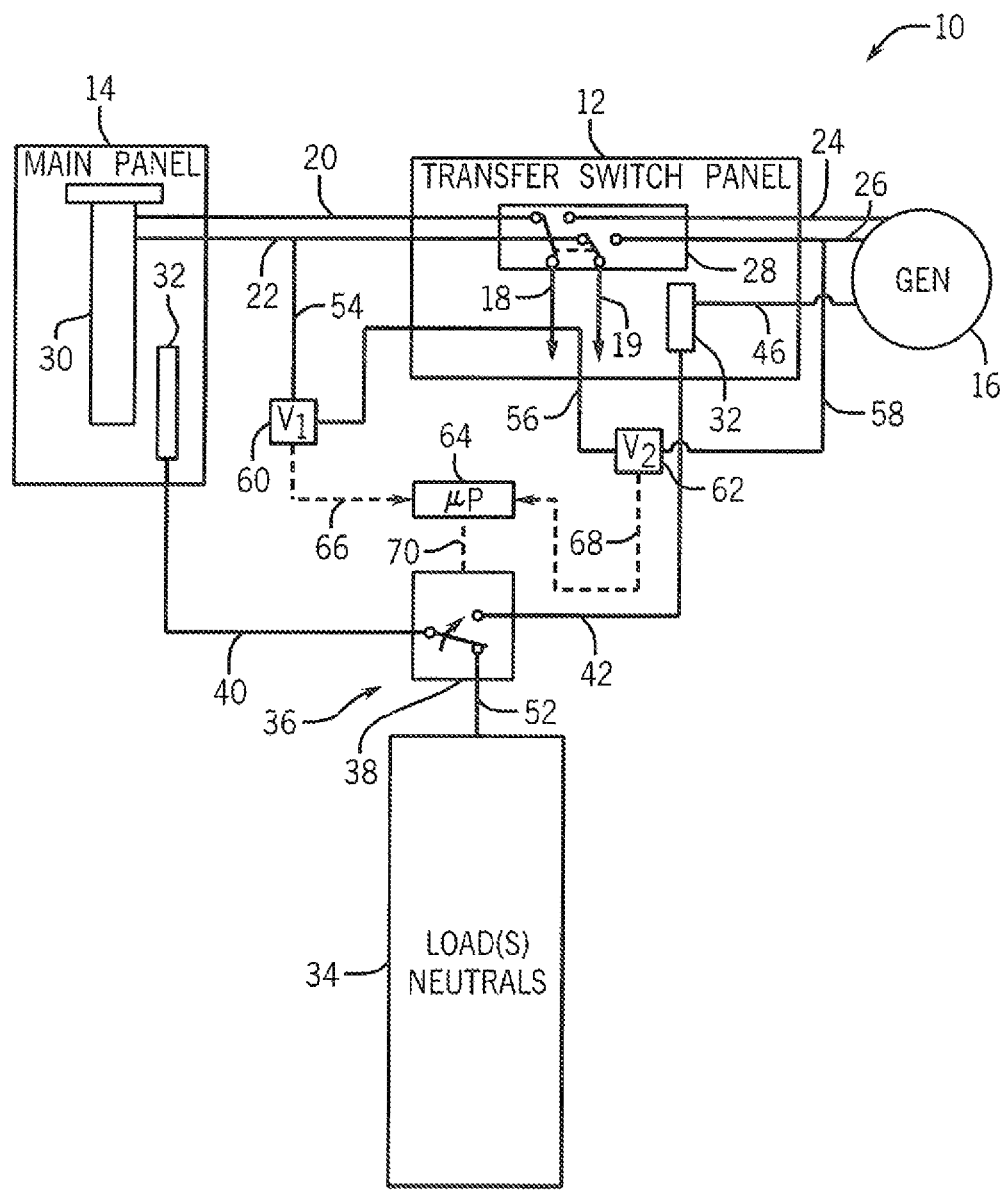
FIG. 2 is a schematic representation showing a transfer switch arrangement for interconnecting an auxiliary power source, such as a portable electrical generator, with a load center or electrical panel associated with a building and having a neutrals switching apparatus according to a second embodiment of the present invention.

In an alternate embodiment, which is schematically shown in FIG. 2, sensors 60, 62 are be used to provide logic HIGH and LOW signals 66, 68 to a microprocessor 64 that in turn provides appropriate command signals 70 to the neutrals transfer switch 38. As illustrated, the sensors 60, 62 are configured to detect the amplitude of the voltage potential between two conductors. Optionally, the sensors 60, 62 may be configured to detect the amplitude of current carried by the conductor.

Voltage sensor 60 measures the voltage potential between the transfer switch panel 12 and the electrical panel 14 across conductors 54 and 56 and voltage sensor 62 measures the voltage potential between the electrical generator 16 and the transfer switch panel 12 across conductors 56 and 58. According to the amplitude of the voltage potential detected between the respective conductors, the sensor 60, 62 transmits a digital logic signal 66, 68 to the microprocessor 64. The microprocessor 64 then provides the appropriate command signals 70 to the neutrals transfer switch 38 to connect the neutral conductor 52 either to the neutral bus 32 of the electrical panel 14 via neutral conductor 40 or to the neutral of the generator 16 via neutral conductor 42.

The present invention may be embodied in a transfer switch panel or, alternately, in an add-on device for a transfer switch panel.

While not specifically shown and described herein, it will be appreciated that the present invention takes advantage of a solidly connected ground wire between the primary and secondary power supplies. This is typically required by many electrical codes, such as the U.S. National Electrical Code. Since each power supply is connected to the neutral ("bonded") in each system, then the neutral current may return to the source on the ground wire when there is no neutral connection. In this regard, it will be appreciated that the neutral switch apparatus described herein is designed to prevent electrical current from returning on the ground wire. This is important because the U.S. National Electrical Code, for example, prohibits the ground wire from carrying normal electrical current.

Various alternatives and embodiments are contemplated as being within the scope of the following claims particularly pointing out and distinctly claiming the subject matter regarded as the invention.

The invention claimed is:

1. An apparatus connectable to a transfer switch panel for automatically connecting neutrals of one or more loads to either a neutral of a first power source or a neutral of an alternate power source, wherein the transfer switch panel includes a transfer switch having a first input configured to receive power from one of a first hot conductor and a second hot conductor from the first power source, a second input configured to receive power from one of a first hot conductor and a second hot conductor from the alternate power source, and an output configured to conduct power from the first power source when the output is connected to the first input and to conduct power from the second power source when the output is connected to the second input, the apparatus comprising:
    a load side neutral conductor that connects to the neutrals of the one or more loads;
    a first neutral conductor that connects to the neutral of the first power source;
    a second neutral conductor that connects to the neutral of the alternate power source;
    a first electrical conductor that connects to either the first hot conductor or the second hot conductor from the first power source that is not connected to the first input of the transfer switch;
    a second electrical conductor that connects to the output of the transfer switch;
    a third electrical conductor that connects to either the first hot conductor or the second hot conductor from the alternate power source that is not connected to the second input of the transfer switch; and
    a switch that connects the load side neutral conductor to the first neutral conductor when a voltage potential between the first electrical conductor and the second electrical conductor is greater than a voltage potential between the second electrical conductor and the third electrical conductor, and connects the load side neutral conductor to the second neutral conductor when the voltage potential between the second electrical conductor and the third electrical conductor is greater than the voltage potential between the first electrical conductor and the second electrical conductor.

2. The apparatus of claim 1 wherein the switch includes an armature movable between a first position in which the load side neutral conductor is connected to the first neutral conductor and a second position in which the load side neutral conductor is connected to the second neutral conductor.

3. The apparatus of claim 2 wherein the switch has at least one coil, and wherein when the first power source is providing power to the transfer switch, the at least one coil is controlled to move the armature to the first position and when the alternate power source is providing power to the transfer switch, the at least one coil is controlled to move the armature to the second position.

4. The apparatus of claim 3 wherein the at least one coil moves the armature to the first position when the voltage potential between the first electrical conductor and the second electrical conductor is 240 volts and moves the armature to the second position when the voltage potential between the third electrical conductor and the second electrical conductor is 240 volts.

5. The apparatus of claim 1 wherein the switch includes a first coil, a second coil, and an armature movable between a first position and a second position, and wherein when the first power source is providing power to the transfer switch, the first coil is energized to move the armature to the first position and when the alternate power source is providing power to the transfer switch, the second coil is energized to move the armature to the second position.

6. The apparatus of claim 1 further comprising a microprocessor that measures the voltage potentials between the first electrical conductor and the second electrical conductor and between the second electrical conductor and the third electric conductor, and provides a command signal to the switch to connect the load side neutral conductor to either the first neutral conductor or the second neutral conductor.

7. The apparatus of claim 6 further comprising a first sensor that provides a first logic signal indicating an operational status of the first power source, a second sensor that provides a second logic signal indicating an operational status of the alternate power source, and wherein the microprocessor receives the first logic signal and the second logic signal, and provides a switching signal to the switch.

8. The apparatus of claim 7 wherein the first sensor measures a voltage potential between the first electrical conductor and the second electrical conductor and the second sensor measures a voltage potential between the second electrical conductor and the third electric.

9. The apparatus of claim 8 wherein:
    the first sensor provides a logic HIGH signal when the voltage potential between the first electrical conductor and the second electrical conductor is 240 volts and provides a logic LOW signal when the voltage potential between the first electrical conductor and the second electrical conductor is 0 volts; and
    the second sensor provides a logic HIGH signal when the voltage potential between the second electrical conductor and the third electrical conductor is 240 volts and provides a logic LOW signal when the voltage potential between the second electrical conductor and the third electrical conductor is 0 volts.

10. An apparatus usable with a transfer switch panel for automatically connecting neutrals of one or more loads to either a neutral conductor of a first power supply or a neutral conductor of a second power supply, wherein the transfer switch panel includes a transfer switch having a first input configured to receive power from one of a first hot conductor and a second hot conductor from the first power supply, a second input configured to receive power from one of a first hot conductor and a second hot conductor from the alternate power supply, and an output configured to conduct power from the first power supply when the output is connected to the first input and to conduct power from the second power supply when the output is connected to the second input, the apparatus comprising:
- a load side neutral conductor that connects to the neutrals of the one or more loads;
- a switch that either connects the load side neutral conductor to the neutral conductor of the first power supply or connects the load side neutral conductor to the neutral conductor of the second power supply;
- a first sensor sensing a first voltage potential between either the first hot conductor or the second hot conductor from the first power supply that is not connected to the first input of the transfer switch and the output of transfer switch and providing a first logic signal corresponding to the first voltage potential;
- a second sensor sensing a second voltage potential between either the first hot conductor or the second hot conductor from the second power supply that is not connected to the second input of the transfer switch and the output of transfer switch and providing a second logic signal corresponding to the second voltage potential; and
- a microprocessor that receives the first logic signal and the second logic signal, and in response thereto provides a switching signal to the switch to connect the load side neutral conductor to the neutral conductor of the first power supply when the first logic signal indicates the first power supply is connected to the output of the transfer switch and to connect the load side neutral conductor to the neutral conductor of the second power supply when the second logic signal indicates the second power supply is connected to the output of the transfer switch.

11. The apparatus of claim 10 wherein:
the first sensor provides a logic HIGH signal when the first voltage potential is 240 volts and provides a logic LOW signal when the first voltage potential is 0 volts; and
the second sensor provides a logic HIGH signal when the second voltage potential is 240 volts and provides a logic LOW signal when the second voltage potential is 0 volts.

12. A method of selectively connecting one of a neutral conductor of a first power source and a neutral conductor of a second power source to a load neutral bus, the method comprising the steps of:
monitoring a first voltage potential between one of a first hot conductor and a second hot conductor from the first power source and an output of the transfer switch, wherein:
- a first input of the transfer switch is configured to receive power from one of theft first hot conductor and the second hot conductor from the first power source,
- the first voltage potential is monitored between either the first hot conductor or the second hot conductor from the first power source that is not connected to the first input of the transfer switch, and
- the output is configured to conduct power from the first power source when the output is connected to the first input;

monitoring a second voltage potential between one of a first hot conductor and a second hot conductor front the second power source and the output of the transfer switch, wherein:
- a second input of the transfer switch is configured to receive power from one of the first hot conductor and the second hot conductor from the second power source,
- the second voltage potential is monitored between either the first hot conductor or the second hot conductor from the second power source that is not connected to the second input of the transfer switch, and
- the output is configured to conduct power from the second power source when the output is connected to the second input;

connecting the load neutral bus to the neutral conductor of the first power source when the first voltage potential is greater than the second voltage potential, indicating the first power source is connected to the output of the transfer switch; and
connecting the load neutral bus to the neutral conductor of the second power source when the second voltage potential is greater than the first voltage potential, indicating the second power source is connected to the output of the transfer switch.

13. The method of claim 12 wherein:
a switch apparatus is used to connect one of the neutral conductor of the first power source and the neutral conductor of the second power source to the load neutral bus;
the step of connecting the load neutral bus to the neutral conductor of the first power source includes energizing a first coil in the switch apparatus to move an armature to a first position, wherein the first coil is energized by the first voltage potential; and
the step of connecting the load neutral bus to the neutral conductor of the second power source includes energizing a second coil in the switch apparatus to move the armature to a second position, wherein the second coil is energized by the second voltage potential.

14. The method of claim 12 wherein:
a switch apparatus including a first sensor, a second sensor, a microprocessor, and an actuator is used to connect one of the neutral conductor of the first power source and the neutral conductor of the second power source to the load neutral bus;
the step of monitoring the first voltage potential includes measuring the first voltage potential with the first sensor and transmitting a signal corresponding to the first voltage potential from the first sensor to the microprocessor;
the step of monitoring the second voltage potential includes measuring the second voltage potential with the second sensor and transmitting a signal corresponding to the second voltage potential from the second sensor to the microprocessor;
the step of connecting the load neutral bus to the neutral conductor of the first power source includes generating a control signal to the actuator from the microprocessor to place the actuator in a first position; and
the step of connecting the load neutral bus to the neutral conductor of the second power source includes generating a control signal to the actuator from the microprocessor to place the actuator in a second position.

* * * * *

UNITED STATES PATENT AND TRADEMARK OFFICE
CERTIFICATE OF CORRECTION

| | | |
|---|---|---|
| PATENT NO. | : 9,509,139 B1 | Page 1 of 1 |
| APPLICATION NO. | : 13/339069 | |
| DATED | : November 29, 2016 | |
| INVENTOR(S) | : Michael O. Flegel | |

It is certified that error appears in the above-identified patent and that said Letters Patent is hereby corrected as shown below:

In the Claims

Claim 8, Column 8, Line 47, delete "electric" and substitute therefor -- electrical conductor --

Claim 12, Column 9, Line 56, delete "theft" and substitute therefor -- the --

Claim 12, Column 10, Line 2, delete "front" and substitute therefor -- from --

Signed and Sealed this
Twenty-eighth Day of February, 2017

Michelle K. Lee
*Director of the United States Patent and Trademark Office*